United States Patent
Mizia et al.

(10) Patent No.: US 7,286,626 B2
(45) Date of Patent: Oct. 23, 2007

(54) NEUTRON ABSORBING COATING FOR NUCLEAR CRITICALITY CONTROL

(75) Inventors: Ronald E. Mizia, Idaho Falls, ID (US); Richard N. Wright, Idaho Falls, ID (US); William D. Swank, Idaho Falls, ID (US); Tedd E. Lister, Idaho Falls, ID (US); Patrick J. Pinhero, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 27 days.

(21) Appl. No.: 11/303,549

(22) Filed: Dec. 15, 2005

(65) Prior Publication Data

US 2007/0140405 A1 Jun. 21, 2007

(51) Int. Cl.
*G21C 19/00* (2006.01)

(52) U.S. Cl. ............... 376/272; 376/339; 376/327; 252/520.22; 250/518.1; 106/18.13

(58) Field of Classification Search ............ 250/518.1, 250/506.1, 515.1, 517.1; 376/272, 261, 339, 376/327; 148/427.301; 164/46
See application file for complete search history.

(56) References Cited

U.S. PATENT DOCUMENTS

| 3,362,813 | A | * | 1/1968 | Ziolkowski ............... 420/41 |
| 4,065,330 | A | * | 12/1977 | Masumoto et al. ......... 148/301 |
| 4,292,528 | A | * | 9/1981 | Shaffer et al. ........... 250/506.1 |
| 4,756,871 | A | * | 7/1988 | Mallener .................... 376/272 |
| 4,780,268 | A | * | 10/1988 | Papai et al. ................ 376/272 |
| 5,334,847 | A | * | 8/1994 | Kronberg ................ 250/506.1 |
| 5,786,611 | A | * | 7/1998 | Quapp et al. ............ 250/515.1 |
| 5,908,486 | A | * | 6/1999 | Flinn et al. ................... 75/232 |
| 5,926,516 | A | * | 7/1999 | Rudnick et al. ........... 376/272 |
| 5,980,604 | A | * | 11/1999 | Lavernia ...................... 75/338 |
| 6,125,912 | A | | 10/2000 | Branagan et al. |
| 6,166,390 | A | * | 12/2000 | Quapp et al. ............ 250/506.1 |
| 6,730,180 | B1 | | 5/2004 | Mizia et al. |
| 6,919,576 | B2 | | 7/2005 | Wright et al. |

OTHER PUBLICATIONS

Mizia et al., "Corrosion 2005", Paper No. 05600, NACE International, 2005, pp. 1-18.

* cited by examiner

*Primary Examiner*—Ricardo J. Palabrica
(74) *Attorney, Agent, or Firm*—Wells St. John, P.S.

(57) ABSTRACT

A neutron absorbing coating for use on a substrate, and which provides nuclear criticality control is described and which includes a nickel, chromium, molybdenum, and gadolinium alloy having less than about 5% boron, by weight.

13 Claims, 1 Drawing Sheet

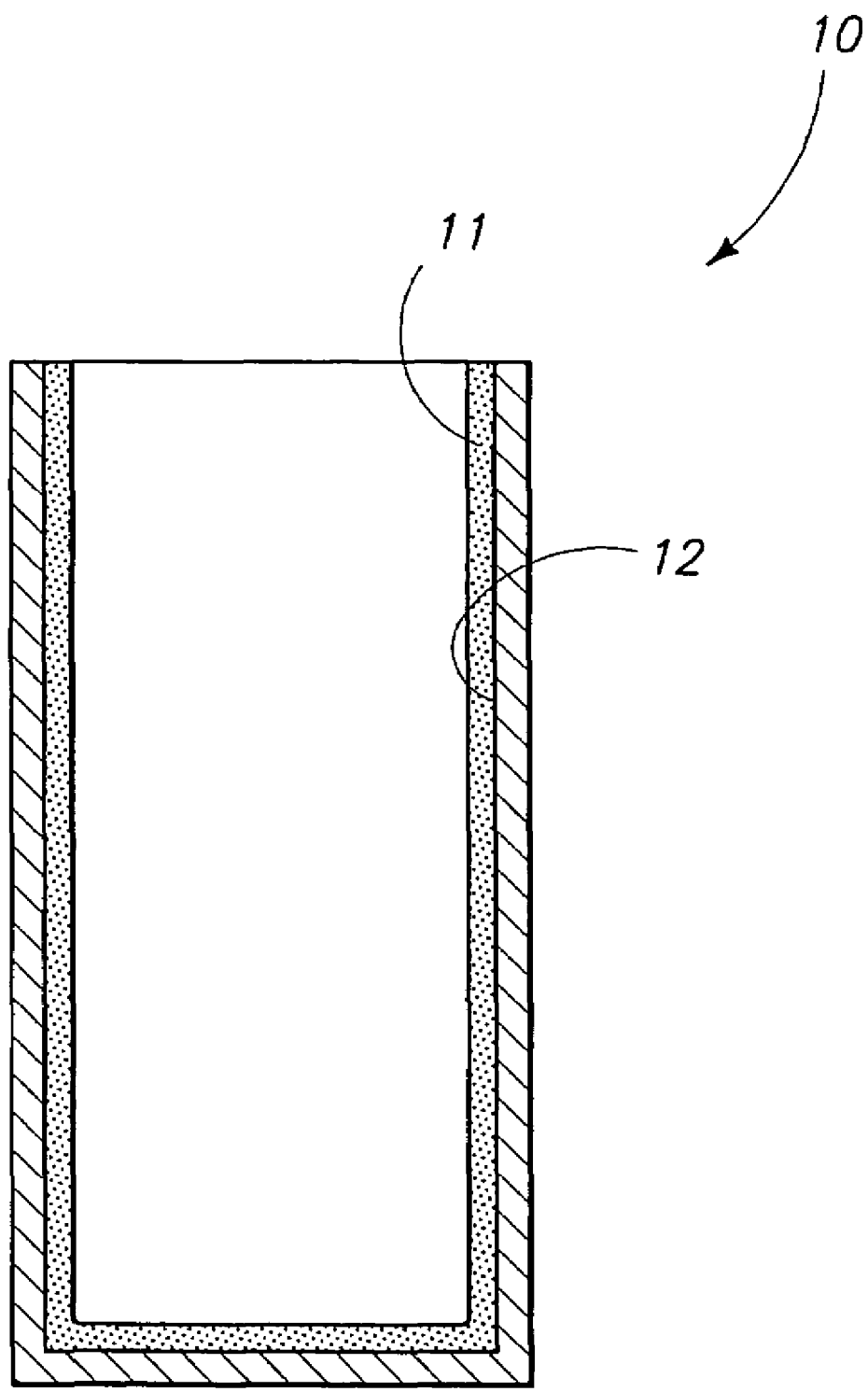

US 7,286,626 B2

NEUTRON ABSORBING COATING FOR NUCLEAR CRITICALITY CONTROL

GOVERNMENT RIGHTS

The United States Government has certain rights in this invention pursuant to Contract No. DE-AC07-05ID14517 between the United States Department of Energy and Battelle Energy Alliance, LLC.

TECHNICAL FIELD

The present invention relates to radiation shielding materials for nuclear criticality control, and more specifically to a neutron absorbing material which may be applied to storage containers for use in spent nuclear fuel applications requiring long term storage and corrosion resistance.

BACKGROUND OF THE INVENTION

The reliance on nuclear power as a method for power generation has increased in recent years due to a corresponding increase in the demand for electrical power throughout the world. Accordingly, the amount of spent nuclear fuel has increased along with the need for safe methods for long term storage and disposal of these radioactive waste materials. Ideal containers for storage and transport of radioactive waste should have the capability of safe containment for as many years as possible. There are however, significant safety issues involved in the safe long-term storage of spent nuclear fuel due to the high levels of uranium enrichment. Various approaches have been developed for the containment of spent nuclear fuel. Prior art references such as U.S. Pat. No. 6,125,912 to Branagan disclose advanced neutron absorber materials and a method of utilizing rare earth metals such as gadolinium, europium and samarium to form metallic glasses and/or noble base nano/microcrystalline materials having a combination of superior neutron capture cross sections along with enhanced resistance to corrosion and oxidative leaching. Still further, U.S. Pat. No. 6,730,180 discloses advanced neutron absorbing structural material for use in spent nuclear applications requiring structural strength, weldability and long term corrosion resistance. This particular reference is directed to a austenitic stainless steel alloy containing gadolinium and less than 5% of a ferrite content. Other nickel-based alloys are also disclosed. In addition to the foregoing, U.S. Pat. No. 6,919,576 and which issued on Jul. 19, 2005 is directed to a composite neutron absorbing coating material applied to a substrate surface, and which includes neutron absorbing layers overlying at least a portion of the substrate surface, and a corrosion resistant top coat layer overlying at least a portion of the neutron absorbing layer. Optional bond coat layers can be formed on the substrate prior to forming the neutron absorbing layer. In this particular patent, the neutron absorbing layer can include neutron absorbing materials such as a gadolinium oxide, gadolinium phosphate, or gadolium in the form of a gadolinide dispersed in a metal allow mixture. The coating layers may be formed by a plasma spray process or a high velocity oxygen fuel process.

While the prior art patents have operated with some degree of success, the inventors have endeavored to try and identify a new neutron absorbing nuclear criticality control material which may, in powder form, be applied to structural internals of spent nuclear fuel packaging components by a thermal spray process and which operates with a greater degree of success. A neutron absorbing coating for nuclear criticality control therefore, is the subject matter of the present invention.

SUMMARY OF THE INVENTION

A first aspect of the present invention relates to a neutron absorbing coating for use on a substrate and which includes a nickel, chromium, molybdenum, and gadolinium alloy having less than about 5% boron, by weight.

Still another aspect of the present invention relates to a neutron absorbing coating and which includes about 0.1% to about 10%, by weight of gadolinium; about 20% to about 24%, by weight of chromium; about 14% to about 16%, by weight of molybdenum; about 0.01% to about 6%, by weight of iron; less than about 5% of boron, by weight; residual amounts of manganese, phosphorous, sulfur, silicon, carbon and nitrogen; and a balance of material substantially comprising nickel, and wherein the nickel is greater than about 40%, by weight.

Still another aspect of the present invention relates to a neutron absorbing coating which may be formed into a powder and is applied over a surface of a container, canister, tube, block, squares, baskets, and/or grid arrays which are used to store and support spent nuclear fuel.

These and other aspects of the present invention will be described in greater detail hereinafter.

BRIEF DESCRIPTION OF THE DRAWINGS

Preferred embodiments of the invention are described below with reference to the following accompanying drawings.

FIG. 1 is a highly simplified cross sectional view of a container which is useful for storing spent nuclear fuel and showing a coating formed of the present invention applied thereon.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention is directed to a thermal neutron absorbing coating material which provides nuclear criticality control and which is useful when applied as a coating material to spent nuclear fuel storage containers or other radioactive waste storage systems such as storage containers and structures within storage containers and more specifically containers, canisters, tubes, blocks, squares, baskets, and/or grid arrays which are used to store and support spent nuclear fuel for storage. A related prior art thermal neutron absorbing coating is described and claimed in U.S. Pat. No. 6,919,576, the teachings of which are incorporated by reference herein. The coating material as provided by the present invention is distinguishable from that shown in U.S. Pat. No. 6,919,576 and has shown sufficient neutron absorbing or neutron poisoning capability and long term corrosion resistance to provide for criticality control and spent nuclear fuel storage systems. The term, "neutron absorbing or neutron poisoning" with reference to the present application refers to the ability of a material or element to interact with neutrons emitted from a radioactive material, such as by attenuating, and/or absorbing such neutrons. A storage container coated with the neutron absorbing material of the present invention is suitable for use in the safe transport, storage, and disposal of radioactive waste and is expected to retain neutron absorbing and radioactive shielding properties for extremely long periods of time.

Referring now to the drawing, wherein a very simplified storage container 10 is shown, it will be seen that the sectional view of FIG. 1 shows a coating 11 applied to an inside substrate surface 12. As seen, the substrate surface can be the interior surface of a spent nuclear fuel storage container 10 such as a Department of Energy standardized canister, or other suitable object. Further, it should be understood that the substrate surface can also be a surface of an internal structural member within a storage container such as tubes, blocks or squares, baskets an array of grids and the like, not shown. FIG. 1 is merely illustrative of one structure that the present invention can be employed with. The neutron absorbing layer 11 contains a mixture of various metallic materials that include neutron absorbing materials. Preferred neutron absorbing materials include gadolinium, and compounds of gadolinium such as gadolinium oxide and gadolinium phosphate as well as various mixtures thereof. Gadolinium is advantageous as a neutron absorbing material since it has the highest thermal neutron absorbing cross-section of any known material. For example, gadolinium has a neutron absorption capability four times as great of boron. Other properties of gadolinium include good malleability and ductility which are extremely favorable characteristics for use in storage containers. Additionally, gadolinium has a relatively low cost (about a factor of five times less expensive then boron) and is available as a metal or an oxide.

When gadolinium oxide is used as the neutron absorbing material, the gadolinium oxide can be synthesized using conventional chemical precipitation processes or can be obtained from various commercial sources. When gadolinium phosphate is used as the neutron absorbing material, either anhydrous or hydrated crystalline phases of gadolinium phosphate can be employed. Anhydrous and hydrated gadolinium phosphates are insoluble in water, which makes these materials favorable in providing a resistance to corrosion and long-term life for a coated storage container 10 and the like. Gadolinium phosphate does not exist in pure form in nature, but can be fabricated by chemical processes commencing with gadolinium containing chemicals. The gadolinide will be incorporated into the metallic powder matrix during the initial powder solidification process during powder manufacturing.

Another suitable neutron absorbing material that can be utilized in the present invention includes boron. In the present invention, the amount of boron is less than about 5% by weight.

Other metallic materials that can be utilized in combination with the neutron absorbing material to form the neutron absorbing coating as provided for in the present invention may include nickel-based alloys. In the present invention, the nickel or nickel-based alloy is greater than about 40% by weight. One suitable nickel-based alloy is UNS NO. 6022 (Alloy 22) available from Anvil, Inc. Alloy 22 exhibits extreme resistance to corrosion even at elevated temperatures. Other suitable metallic materials that can be utilized in combination with the neutron absorbing material, as described above, include but is not limited to UNS NO. 06625; UNS NO. 86276; UNS NO. S30403; and UNS NO. S31603. In the present invention, the preferred neutron absorbing composition comprises a metal alloy comprising nickel, molybdenum, gadolinium, chromium, iron and boron. As should be understood, a plurality of the neutron absorbing particles comprising gadolinium are dispersed in the metal alloy matrix. In the present invention, a first broad aspect of the present invention relates to a neutron absorbing coating 11 for use on a substrate 12 which comprises a nickel, chromium, molybdenum, and gadolinium alloy having less than about 5% boron, by weight. In the present invention, the neutron absorbing coating 11 forms an alloy matrix which is applied to the supporting surface or substrate 12. In the present invention, the neutron absorbing coating includes gadolinium in an amount equal to about 0.1 to about 10%, by weight. Still further, the neutron absorbing coating 11 of the present invention includes molybdenum in an amount of about 1.5 to about 16%, by weight. Moreover, the neutron absorbing coating 11 further includes chromium in an amount of about 13% to about 24%, by weight. In the present alloy, the amount of nickel is greater than about 50%, by weight. In the neutron absorbing coating 11 as discussed herein, the neutron absorbing coating further includes about 0.1 to about 6%, by weight, of iron; and residual amounts of manganese, phosphorous, sulfur, silicon, carbon, and nitrogen. In the arrangement as shown in FIG. 1, the neutron absorbing coating is applied to a container 10 or an internal or the like to a thickness of about 0.1 to about 2 mm. As earlier discussed, the substrate 12 may be incorporated, at least in part, into an object 10 which is selected from the group comprising storage containers, canisters, tubes, blocks, squares, baskets and grid arrays which are used to store or support spent nuclear fuel.

More specifically, the present invention relates to a neutron absorbing coating 11 which includes about 0.1% to about 10%, by weight of gadolinium; about 20% to about 24%, by weight of chromium; about 14% to about 16%, by weight of molybdenum; about 0.01% to about 6%, by weight of iron; less than about 5% of boron, by weight; residual amounts of manganese, phosphorous, sulfur, silicon, carbon and nitrogen; and a balance of material substantially comprising nickel, and wherein the nickel is greater than about 40%, by weight. In the present invention, the coating is formed into a powder and is applied over a surface of a container 10, canister, tube, blocks, squares, baskets, and/or grid arrays which are used to store or support spent nuclear fuel. The coating of the present invention has a thickness of less than about 2 mm.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A neutron absorbing coating for use on a substrate, comprising:
   a nickel, chromium, molybdenum, and gadolinium alloy having less than about 2000 PPM Boron.

2. A neutron absorbing coating as claimed in claim 1, and wherein the alloy forms a matrix.

3. A neutron absorbing coating as claimed in claim 1, and wherein the gadolinium is present in the amount of about 0.1 to about 10%, by weight.

4. A neutron absorbing coating as claimed in claim 1, and wherein the molybdenum is present in the amount of about 1.5 to about 16%, by weight.

5. A neutron absorbing coating as claimed in claim 1, and wherein the chromium is present in the amount of about 13% to about 24%, by weight.

6. A neutron absorbing coating as claimed in claim 1, and wherein the nickel is greater than about 50%, by weight.

7. A neutron absorbing coating as claimed in claim 6, and further comprising:
   about 0.1 to about 6%, by weight, of iron.

8. A neutron absorbing coating as claimed in claim 7, and further comprising:
   residual amounts of manganese, phosphorous, sulfur, silicon, carbon, and nitrogen.

9. A neutron absorbing coating as claimed in claim 1, and which has a thickness dimension of about 0.1 to about 2 mm.

10. A neutron absorbing coating as claimed in claim 1, and wherein the substrate is incorporated, at least in part, into an object which is selected from the group comprising storage containers, canisters, tubes, blocks, squares, baskets and grid arrays which are used to store or support nuclear fuel.

11. A neutron absorbing coating, comprising:
   about 0.1% to about 10%, by weight of gadolinium;
   about 20% to about 24%, by weight of chromium;
   about 14% to about 15%, by weight of molybdenum;
   about 0.01% to about 6%, by weight of iron;
   less than about 2000 PPM Boron;
   residual amounts of manganese, phosphorous, sulfur, silicon, carbon, and nitrogen; and
   a balance of material substantially comprising nickel, and wherein the nickel is greater than about 40%, by weight.

12. A neutron absorbing coating as claimed in claim 11, and wherein the coating is formed into a powder, and is applied over a surface of a container, canister, tube, blocks, squares, baskets, and/or grid arrays which are used to store or support nuclear fuel.

13. A neutron absorbing coating as claimed in claim 11, and wherein the coating has a thickness of less than about 2 mm.

* * * * *